United States Patent Office 2,975,029
Patented Mar. 14, 1961

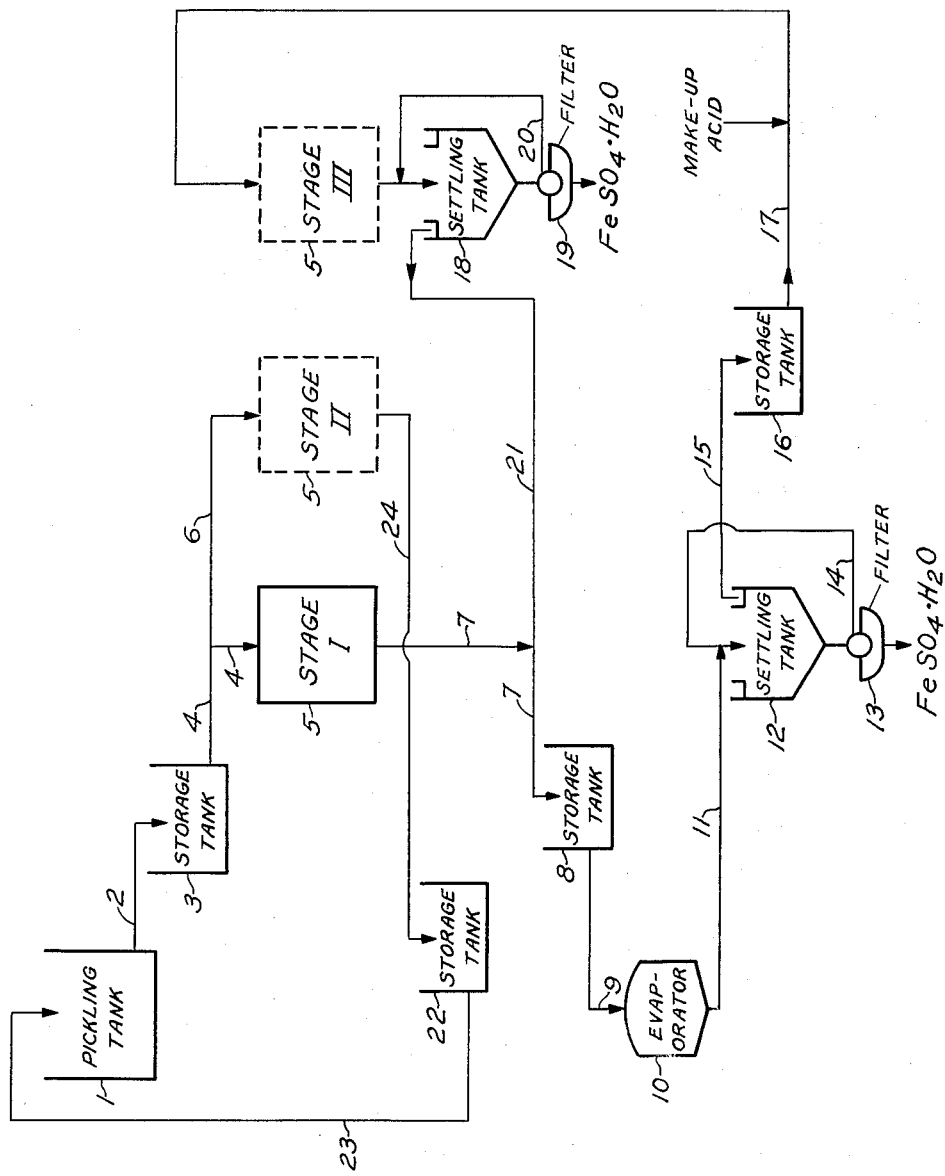

2,975,029
WASTE PICKLE LIQUOR RECOVERY PROCESS

James B. Horton, Allentown, and Earl J. Serfass, Bethlehem, Pa., assignors to Bethlehem Steel Company, a corporation of Pennsylvania Filed Dec. 30, 1957, Ser. No. 705,927

7 Claims. (Cl. 23—172)

This invention relates to the regeneration of an iron-bearing cation exchange resin. More particularly, the invention relates to an acid reclaiming method wherein the contaminated acid is treated with an ion exchange resin, with the subsequent regeneration of the resin, and recovery of a large part of the regenerant, and wherein the metal values may be recovered as well.

In the acid pickling of metals, and particularly of ferrous metals, mineral acid solutions of sulfuric, phosphoric, nitric, hydrofluoric or hydrochloric acid are generally used. Ordinarily, a sulfuric acid bath, used for pickling of ferrous metals, becomes inefficient after the metal content of the bath exceeds about five percent, at which point the pickle liquor is usually discarded, the discarded bath then presenting a disposal problem.

Over the years a variety of methods have been proposed for the recovery of the acid values from waste acid liquor, including treatment of the waste liquor with an ion exchange material. Methods of treating waste acid liquor with an ion exchange material have had the disadvantage that the solution used to regenerate the exchange material was either lost after the regenerating step, or if recovered, required a series of lengthy reclaiming steps.

We have found a method for treating waste iron bearing acids, wherein not only are the acid values reclaimed satisfactorily, but the resin is regenerated and the larger part of the regenerant reclaimed as well. The metal values, which separate from the reclaimed regenerant, may be recovered in usable form by a separate operation.

When waste iron sulfate liquor is passed over the hydrogen form of a cationic exchange resin, the following reaction will take place:

$$2HR + FeSO_4 \rightarrow FeR_2 + H_2SO_4$$

The extent to which the above reaction will proceed will be a function of the ferrous sulfate and sulfuric acid in the waste pickle liquor.

We have found that if the ferrous form of the resin is treated with strong sulfuric acid, the resin will be regenerated as shown by the following equation:

$$FeR_2 + 2H^+ \rightarrow 2HR + Fe^{++}$$

the iron being removed from the iron-bearing resin in the form of ferrous sulfate. It will be observed that the two reactions, shown above, are in reality the manifestation of an equilibrium reaction, and they may be combined as follows:

$$2HR + FeSO_4 \rightleftharpoons FeR_2 + H_2SO_4$$

Actually, in using ion exchange resins to recover acid values and in regenerating the resin, the extent of ion exchange is governed by an equilibrium between the composition of the solution and the resin, with respect to the ions being exchanged. This equilibrium can be represented by the following equation:

$$\frac{(A_{Fe_s^{++}})(A_{H_r^+})^2}{(A_{H_s^+})^2(A_{Fe_r^{++}})} = K$$

where A = activities of various ionic species taking part in the reaction. For a given ion exchange resin, K is a constant for a given reaction at any given temperature. The terms in this equilibrium expression may be rearranged as follows:

$$K = \frac{\dfrac{(A_{Fe_s^{++}})}{(A_{H_s^+})^2}}{\dfrac{(A_{Fe_r^{++}})}{(A_{H_r^+})^2}}$$

When resin has been regenerated with strong sulfuric acid having a low iron content, and thus having produced in the resin a very low ratio of

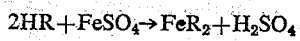

any solution having a ratio of

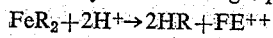

greater than this will exchange its $Fe^{++}$ ion for $H^+$ ion in the resin until equilibrium is established. This exchange of iron from solution to the resin will take place regardless of the strength of the iron-bearing solution being treated.

When strong sulfuric acid of the proper concentration is used as the resin regenerant, the iron compound will precipitate as ferrous sulfate monohydrate ($FeSO_4 \cdot H_2O$). The specific gravity of the precipitated ferrous sulfate is greater than that of the sulfuric acid solution, and thus the precipitate will settle to the bottom of the acid. On the other hand, the specific gravity of the regenerated resin is less than that of the sulfuric acid solution, and the regenerated resin will thus float on the sulfuric acid solution. Therefore, when spent sulfuric acid pickle liquor is treated with an ion exchange resin, followed by regeneration of the resin with strong sulfuric acid, the sulfate in the waste pickle liquor may be completely restored as sulfuric acid, the resin is regenerated for further use as an ion exchange medium, iron, originally removed from the spent pickle liquor by the resin, is in turn removed from the resin as a readily separable solid, and the unreacted portion of the regenerant solution is available for further use as a regenerant.

The accompanying drawing is a flow sheet which is illustrative of the manner in which our invention may be put into operation.

A waste pickle liquor such as waste iron sulfate solution, is run through a column which contains pre-treated cation exchange resin of the polystyrene type. As purchased resin is frequently in the sodium form, in which case the resin should be pretreated with a strong mineral acid, such as nitric acid, to obtain the hydrogen form. The resin must have a high affinity for iron, so that in passing through the column, the iron of the waste pickle liquor will react with resin. The effluent from the column represents regenerated sulfuric acid containing the greater portion of the sulfuric acid present in the waste liquor before the ion-exchange treatment, as well as that acid reformed from sulfate of the ferrous sulfate, and less than 1.5% of the iron present before such treatment. The regenerated pickle liquor may be reused for pickling, either by itself, if sufficiently concentrated, or as make-up with more concentrated acid. Waste pickle liquor may be run through the resin column continuously until such time as the resin loses its high exchange rate. It has been found that the resin retains this high affinity for iron until the resin becomes saturated to the extent of approximately 11.5% iron (Fe).

In regenerating, the column of exhausted, or iron-saturated, resin should be treated with concentrated sulfuric acid. While an 80% sulfuric acid solution may be considered an optimum concentration, satisfactory results can be obtained with a sulfuric acid content ranging from 55% to 96%. The effluent, which may be withdrawn to a container, contains concentrated sulfuric acid and iron sulfate. The iron sulfate precipitates in concentrated acid of the effluent as ferrous sulfate monohydrate, the precipitate settling to the bottom of the container.

The method for regenerating resin just described, wherein regeneration is performed in a column, has certain inherent advantages, such as possible continuous operation. However, somewhat superior results can be obtained for the recovery of iron from the resin if regeneration is performed as a batchwise operation. In batchwise treatment the iron-bearing resin is stirred continuously with a concentrated sulfuric acid solution for a definite period of time. Batch regeneration results in a system comprising a liquid phase and two solid phases, i.e., sulfuric acid solution, precipitated ferrous sulfate monohydrate and the ion exchange resin. In a sulfuric acid regenerant solution of the desired concentration (55%–96% $H_2SO_4$), the resin will float on the solution and the precipitated iron sulfate will sink to the bottom. It is then a simple matter to obtain a clean separation of the three phases. Likewise, the iron sulfate, after separation from the acid, may be filtered and washed, if recovery of this product is desired. The recovered concentrated sulfuric acid is available for re-use as a resin regenerant.

Resins which we have found to be most useful in the recovery of acid from iron salt solutions are the oxidation-resistant resins of the type known as sulfonated polystyrene cation exchange resins. These resins are sold under various trade names such as Amberlite 1R–112, Amberlite 1R–120, Permutit Q and Dowex 50. The resins have a capacity of approximately 0.115 gram of iron exchanged per gram of resin.

Our system of regenerating iron-bearing resin, i.e., treatment of the resin with concentrated sulfuric acid, is not restricted to those iron-bearing resins formed in the reclaiming of spent sulfuric acid pickling solutions. Any iron-bearing resin, provided the resin is one of the class referred to above, may be regenerated by our method to produce a reclaimed concentrated regenerant solution and precipitated ferrous sulfate monohydrate. Thus, our resin regenerating system may be adapted to the regeneration of resins which have been used to reclaim acid from waste phosphoric, hydrofluoric, nitric or hydrochloric acid pickling baths, as well as from other solutions such as those produced in hydrometallurgical operations. When strong sulfuric acid is used as the resin regenerant, following the reclaiming of acids other than sulfuric, water washing of the resin will be required after each step, to avoid cross contamination of the solutions.

The following description of an experimental example illustrates one way in which our invention may be performed.

A sample of waste pickle liquor, which analyzed 11.7% ferrous sulfate ($FeSO_4$), 4.4% sulfuric acid ($H_2SO_4$) and 83.9% water, was passed over the hydrogen form of Amberlite 1R–112 until the resin was completely saturated. The resin was contained in a glass column 24 inches in length and 0.63 inch in diameter. Suction was applied to the column in order to remove the excess waste pickle liquor from the iron-saturated resin.

The iron-bearing resin, in equilibrium with the waste pickle liquor, was removed from the column and a sample equivalent to 10 grams of dry resin was placed in a beaker for batch regeneration.

A regenerant sulfuric acid solution was prepared by dissolving ferrous sulfate heptahydrate ($FeSO_4 \cdot 7H_2O$) in 81% sulfuric acid. The mixture was stirred for a period of four hours and finally filtered through a sintered glass funnel. The resulting solution analyzed slightly less than 81% sulfuric acid and 0.3% ferrous sulfate.

Twenty-five milliliters of the regenerant solution was added to the beaker containing the 10 gram sample of iron-bearing resin. The resultant mixture was stirred for a period of one hour. After stirring, the mixture was allowed to settle to effect the separation of the resin from the ferrous sulfate which precipitated in the form of the monohydrate. The regenerated resin was skimmed off of the sulfuric acid. Ferrous sulfate monohydrate, which precipitated, settled to the bottom of the acid and was separated from the acid by filtration.

The regenerated resin was tested for iron content. Iron remaining on the resin equalled 1.20% Fe. The spent resin regenerant had the following analysis:

$H_2O$—39.3%; $H_2SO_4$—60.4%; $FeSO_4$—0.3%

To bring the spent resin regenerant back to its original strength, so that it can be reused, the acid should be evaporated to a more concentrated condition, or, the concentration may be increased by addition of strong make-up acid.

The acid and ferrous sulfate concentrations of the waste pickle liquor of the example are somewhat higher than the respective concentrations in waste pickle liquor from the batch pickling of wire, and somewhat lower than the concentrations in such liquor from continuous strip pickling. However, concentrations of waste pickle liquor from any amount from 2% to 30% sulfuric acid can be reclaimed by the ion exchange resin, the economics of the process being more attractive for the stronger solutions of iron content.

The acid reclaiming step is not limited to 30% acid, for, as has been previously explained, a waste iron solution of any concentration may be reclaimed wherein the ratio of

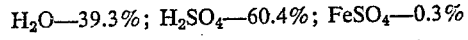

$$\frac{(A_{Fe_s^{++}})}{(A_{H_s^+})^2}$$

is greater than the corresponding resin ratio of $$\frac{(A_{Fe_r^{++}})}{(A_{H_r^+})^2}K$$

While column regeneration of the resin may be desirable in some instances, this method requires the use of more strong acid. Furthermore, the speed of acid flow during regeneration must be controlled to prevent channelling of the resin in the column. In most cases, batchwise regeneration will be preferred, for, in this variant of the regeneration method, optimum regeneration is obtained with a minimum of regenerant. As the resin floats on the concentrated heavier regenerant solution in the batch method, the resin is separated readily from the acid, upon completion of the regenerating step.

In order to show how our process can be utilized as a practical cyclic process, an example is given below for a balanced system. In this example, Dowex 50 (16% cross linked) resin is used as the ion-exchange medium, as the Dowex resin has a lower affinity for regenerant solution than some of the other polystyrene types.

Referring to the flow sheet, a quantity of 48,560 pounds of waste pickle liquor from storage tank 3, containing 4.4% sulfuric acid and 11.7% ferrous sulfate, is divided into two parts, one part, designated as liquor number 1, and the other part as liquor number 2.

A quantity of 14,310 lb. of liquor No. 1 is transferred from tank 3 through pipe 4 and introduced into chamber 5 at stage I, where the liquor flows downwardly through a column of resin, the resin being in the hydrogen form after having been regenerated from previous use. To treat the liquor, 18,990 pounds of resin, calculated on a dry basis, are used. The treated liquor is withdrawn at the bottom of the column and contains 3860 lb., or 29.5% sulfuric acid and only 40 lb., or 0.4% $FeSO_4$. The acid in the effluent comprises acid from the waste pickle liquor, acid regenerated from the ferrous sulfate in the waste pickle liquor, and acid washed from the regenerated resin. Wet, regenerated resin carries considerable strong sulfuric acid, as will be explained. The effluent contains acid designated as reclaim No. 1, said acid being transported through pipe 7 to storage tank 8, thence through pipe 9 to evaporator 10.

The resin in the column is now partially saturated, and contains 1290 lb. of iron combined as FeR$_2$, 6960 lb. of water, 2930 lb. of sulfuric acid and 40 lb. of ferrous sulfate.

Liquor No. 2 in a quantity of 34,250 lb. is flowed through the column in chamber 5 at stage II by means of pipe 6. The rate of flow is the same as in stage I. The effluent from stage II, designated as reclaim No. 2, contains 5660 lb., or 17.2% sulfuric acid and 230 lb., or 0.7%, ferrous sulfate. Reclaim No. 2 passes through pipe 24 to storage tank 22, from which it is eventually returned, through pipe 23, to pickling tank 1. This reclaim may be strengthened, either by evaporation, or by addition of strong acid, if necessary.

The resin in column 5, after the stage II operation, is in a saturated condition and contains 2250 lb. of iron combined as FeR$_2$, 8650 lb. of water, 460 lb. of sulfuric acid, and 1200 lb. of ferrous sulfate.

Reclaim No. 1, after being concentrated by atmospheric evaporation at evaporator 10, is transferred by pipe 11 to settling tank 12. After sufficient settling time, the supernatant liquor is transferred by pipe 15 to storage tank 16. Any ferrous sulfate monohydrate which settles out is withdrawn to filter 13. The filter cake formed in the filtering operation may be discarded, or subjected to further processing to recover a usable iron product. The filtrate is returned to settling tank 12 by means of pipe 14. The concentrated acid from storage tank 16, along with 66° Bé. make-up acid required to maintain the proper concentration and volume, is passed through pipe 17 to chamber 5 at stage III. In stage III the saturated resin is regenerated with the strong acid. The regenerant in this instance has a concentration of 62% sulfuric acid (100% H$_2$SO$_4$ basis). A small amount of unprepicitated ferrous sulfate, amounting to 0.4% FeSO$_4$, will be contained in the regenerant solution. In this example we prefer to regenerate the saturated resin in a batchwise operation, i.e., remove the resin from the column, at stage II to a tank at stage III, where the resin is stirred with the regenerant for a period of about 30 minutes. The wet, saturated resin, in an amount of 31,559 lb. is treated with 70,340 lb. of regenerant solution. After the regeneration step is completed, the resin is removed from the surface of the regenerant soultion, and returned to the column for further use in reclaiming waste pickle liquor. The regenerated resin has an analysis of 680 lb. of iron combined as FeR$_2$, 5080 lb. of sulfuric acid, 90 lb. of ferrous sulfate and 4120 lb. of water, the resin itself remaining at its original weight of 18,990 lb. (dry weight weight basis). The spent regenerant enters settling tank 18. After sufficient time to permit ferrous sulfate monohydrate to precipitate and settle, the supernatant liquor is discharged through pipe 21 to storage tank 8, where it is mixed with the effluent from stage I, the mixed solutions then being processed as previously described for reclaim No. 1. The ferrous sulfate monohydrate is withdrawn from the settling tank 18, and introduced into filter 19. After filtering, the monohydrate may be discarded or combined with the filter cake from filter 13 for further processing. The filtrate from filter 19 is returned by pipe 20 to settling tank 18. The monohydrate withdrawn from the settling tank, before filtration, contains 5670 lb. of ferrous sulfate monohydrate, 630 lb. of water, 780 lb. of sulfuric acid and 10 lb. of ferrous sulfate (FeSO$_4$). The clear solution from the stage III effluent, which is combined with the stage I effluent, contains 36,010 lb. of sulfuric acid, 600 lb. of ferrous sulfate (FeSO$_4$) and 29,190 lb. of water. The combined solution in storage tank 10 will analyze 50.5% sulfuric acid with about 0.8% ferrous sulfate.

It will be noted that in our cyclic method, the regenerated resin has had approximately two-thirds of the combined iron removed from it. A two-thirds regeneration proves quite satisfactory for a resin which is to be re-used as an ion-exchange medium. The resin also holds considerable strong sulfuric acid, which is washed from the resin at stage I.

It will be readily apparent that many modifications can be made in the process just outlined, without altering the nature of the invention. For example, separate batch operations may be utilized for each of the stages I, II and III, instead of the cyclic system shown, or the system can be made continuous by installing fresh resin columns at each of the stages, independent of the time required for any of the other two stages to be completed.

Vacuum evaporation could be substituted for atmospheric evaporation. The lower temperature required in vacuum evaporation might be utilized advantageously in the handling of corrosive liquids, such as the sulfuric acid of the process.

The make-up acid could be introduced into the system prior to evaporator 11 to take advantage of the heat of dilution in the evaporating step. However, introducing make-up acid at the point shown in the flow sheet reduces handling of the concentrated acid.

We claim:

1. The method of reclaiming acid from an aqueous solution of a free mineral acid of the group consisting of sulfuric, phosphoric, nitric, hydrofluoric and hydrochloric and an iron salt which comprises bringing said solution into reactive contact with the hydrogen form of a cation exchange resin and thereby removing iron from solution in the form of an iron-bearing resin and forming additional free acid, then treating the iron-bearing resin with concentrated sulfuric acid having a strength ranging from 55% to 96%, and thereby regenerating said resin and precipitating ferrous sulfate, said concentrated acid having a specific gravity greater than the specific gravity of the regenerated resin and less than the specific gravity of the precipitated ferrous sulfate.

2. The method of reclaiming acid from an aqueous solution of free sulfuric acid and iron sulfate which comprises bringing said solution into reactive contact with the hydrogen form of a cation exchange resin and thereby removing iron from solution in the form of an iron-bearing resin and forming additional free acid, then treating the iron-bearing resin with concentrated sulfuric acid of a strength ranging from 55% to 96% and thereby regenerating said resin and precipitating ferrous sulfate, said concentrated sulfuric acid having a specific gravity greater than the specific gravity of the regenerated resin and less than the specific gravity of the precipitated ferrous sulfate.

3. The method of reclaiming acid from an aqueous solution of free sulfuric acid and iron sulfate which comprises bringing said solution into reactive contact with the hydrogen form of a cation exchange resin of the sulfonated polystyrene type and thereby removing iron from solution in the form of an iron-bearing resin and forming additional free acid, then treating the iron-bearing resin with concentrated sulfuric acid of a strength ranging from 55% to 96% and thereby regenerating said resin and precipitating iron sulfate, said concentrated sulfuric acid having a specific gravity greater than the specific gravity of the regenerated resin and less than the specific gravity of the precipitated ferrous sulfate.

4. The method of reclaiming acid from an aqueous solution of free sulfuric acid in an amount of from 2% to 24% and iron sulfate in an amount of from 5% to 25% which comprises bringing said solution into reactive contact with the hydrogen form of a cation exchange resin of the sulfonated polystyrene type and thereby removing iron from solution in the form of an iron-bearing resin and forming additional free acid, then treating the iron-bearing resin with concentrated sulfuric acid of a strength ranging from 55% to 96% and thereby regenerating said resin and precipitating ferrous sulfate, said concentrated sulfuric acid having a specific gravity greater than the specific gravity of the resin regenerated and less than the specific gravity of the ferrous sulfate precipitated.

5. In a method for reclaiming acid from a waste acid solution containing dissolved iron salts by contacting said acid with a cation exchange resin and thereby producing the ferrous iron form of the resin and then regenerating the spent resin, the step of regenerating the spent resin which comprises treating said spent resin with concentrated sulfuric acid of a strength ranging from 55% to 96% and thereby regenerating said resin and precipitating iron sulfate, the solution remaining after said regeneration having a specific gravity greater than the specific gravity of the regenerated resin and less than the specific gravity of the precipitated ferrous sulfate.

6. The method of reclaiming acid from an aqueous solution of free sulfuric acid and iron sulfate which comprises first: the step of bringing said solution into reactive contact with the hydrogen form of a cation exchange resin and thereby removing iron from solution in the form of an iron-bearing resin and forming additional free acid and second: the step of treating said iron-bearing resin with concentrated sulfuric acid of a strength ranging from 55% to 96% and thereby regenerating said resin and precipitating ferrous sulfate, said concentrated sulfuric acid having a specific gravity greater than the specific gravity of the regenerated resin and less than the specific gravity of the precipitated ferrous sulfate, then combining recovered free acid from said first step with spent regenerant acid from said second step and using the combined acids for treating additional iron-bearing resin.

7. The method of resclaiming acid from an aqueous solution of from 5% to 10% free sulfuric acid and from 12% to 18% of ferrous sulfate which comprises, first: the step of bringing said solution into reactive contact with a cation exchange resin in the hydrogen form and thereby removing iron from solution in the form of an iron-bearing resin and forming additional free acid and, second: the step of treating said iron-bearing resin with concentrated sulfuric acid of a strength ranging from 55% to 96% and thereby regenerating said resin and precipitating ferrous sulfate, said concentrated sulfuric acid having a specific gravity greater than the specific gravity of the regenerated resin and less than the specific gravity of the precipitated ferrous sulfate, combining a portion of recovered free acid from said first step with spent regenerant acid from said second step and using the combined acids for treating additional iron-bearing resin, and recirculating the remainder of the recovered free acid from said first step to a pickling operation.

References Cited in the file of this patent
UNITED STATES PATENTS

| 2,322,134 | Hodge | June 15, 1943 |
| 2,662,812 | Shaw | Dec. 15, 1953 |

OTHER REFERENCES

Fradkin et al.: Ind. and Eng. Chem., vol. 47, #1, January 1955, pp. 87–90.